J. M. PEEPLES.
SEED TESTER.
APPLICATION FILED AUG. 27, 1912.
1,057,877.
Patented Apr. 1, 1913.
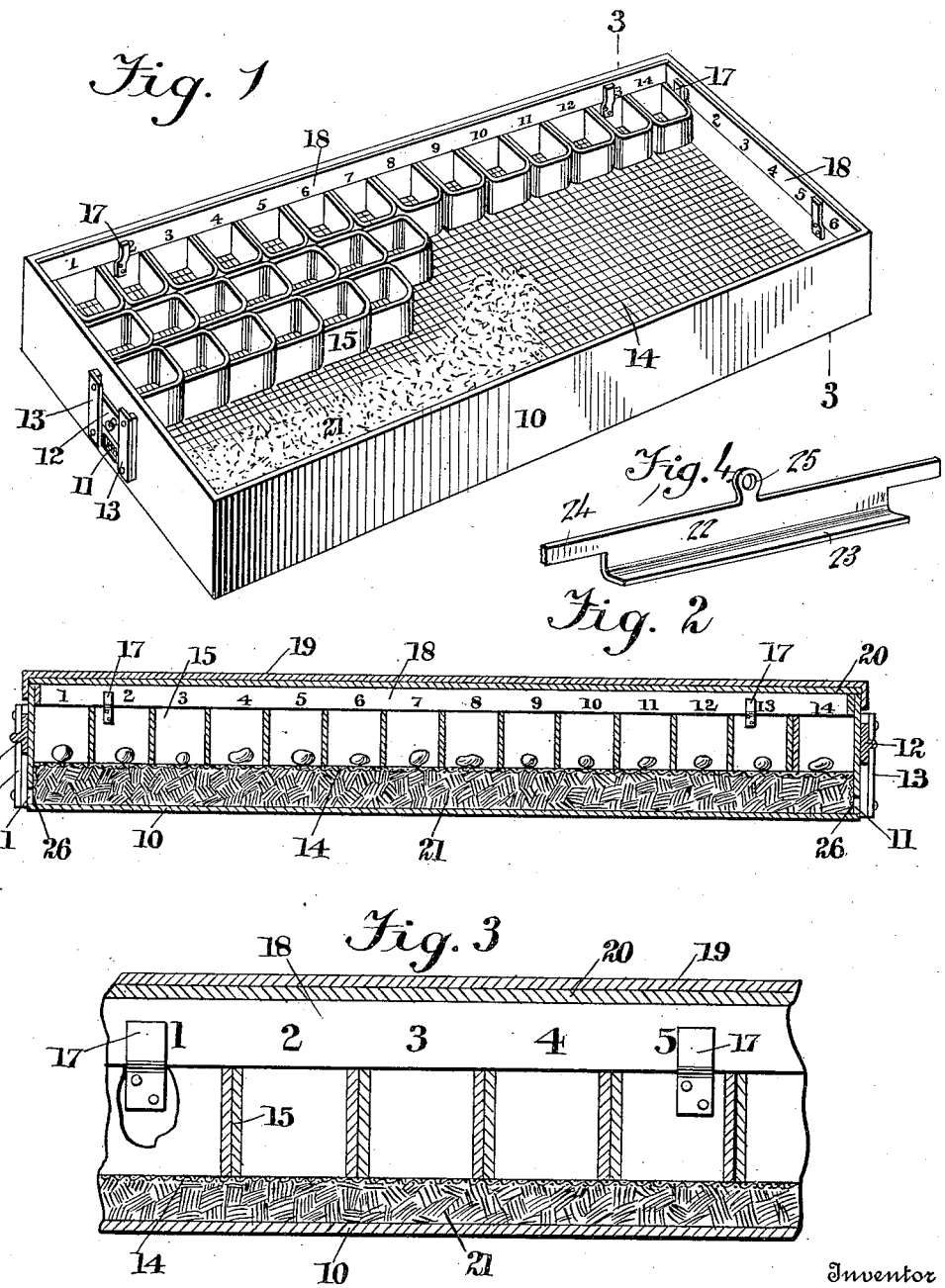
Witnesses
Alfred G. Sailer
P. H. Hoster
Inventor
John M. Peeples
By Victor J. Evans
Attorney

UNITED STATES PATENT OFFICE.

JOHN MORTON PEEPLES, OF CENTRALIA, ILLINOIS.

SEED-TESTER.

1,057,877. Specification of Letters Patent. Patented Apr. 1, 1913.

Application filed August 27, 1912. Serial No. 717,371.

*To all whom it may concern:*

Be it known that I, JOHN MORTON PEEPLES, a citizen of the United States, residing at Centralia, in the county of Marion and State of Illinois, have invented new and useful Improvements in Seed-Testers, of which the following is a specification.

The invention relates to seed testers and has for an object to provide a device by means of which a comparison of the germinating powers of different seeds can be easily and efficiently obtained. For the purpose mentioned, use is made of a pan provided with openings normally closed by suitable closures, the said pan being adapted to contain a soil, a screen mounted to repose on the said soil, containers formed of a U-shaped piece of material and adapted to be positioned on the mentioned screen with the sides of the pan adapted to constitute a side of each of the containers arranged adjacent to the sides of the pan, with a side of each of the mentioned containers adapted to constitute a side of other containers consisting of U-shaped pieces of material and arranged adjacent the containers which are disposed adjacent the sides of the pan, graduated strips for removable insertion in the said pan for numbering the seeds which are positioned in the said containers and a cover for removable engagement with the said pan to close the same.

Reference is to be had to the accompanying drawings constituting a part of this specification, in which similar characters of reference denote corresponding parts in all the views, and in which—

Figure 1 is a perspective view of my device, the cover having been removed therefrom. Fig. 2 is a vertical longitudinal view of my device the cover being mounted thereon. Fig. 3 is an enlarged fragmentary sectional view taken on the line 3—3 in Fig. 1 showing the manner of mounting the graduating strips on the pan. Fig. 4 is a perspective view of the leveling plate.

Referring more particularly to the views, I provide a pan 10 having openings 11 in the ends thereof, the said openings being normally closed by closures 12 mounted to slide vertically on guides 13 secured to the outer sides of the ends of the pan. A perforated screen 14 is adapted for disposal in the said pan and a series of containers 15 are provided, the said containers being adapted to be positioned on the screen 14.

The containers 15 each consist of an integral piece of material 16, preferably metal, bent in a U-shaped form so that when the containers are arranged in the pan, the containers which are positioned to abut against the sides of the pan, each will have a side thereof formed by the sides of the pan, and each succeeding container will have a side thereof formed by a side of the container immediately in front of the succeeding container as will be readily understood. In this manner any particular container can be removed without disturbing any of the other containers, and each container will be independently removable relatively to the next adjacent container. The containers are preferably arranged in rows within the pan 12 and mounted in the pan are supports 17 adapted to removably receive graduated strips 18, each of the said strips being provided with numerals, one numeral being opposite each row of containers, thus enabling the operator to find a designating number for each container and also enabling him to at all times know the number of a seed reposing in a particular container as will be readily understood.

A cover 19 is adapted for removable engagement with the pan 12 and a cloth 20 is preferably secured to the under side of the cover in any convenient manner for a purpose that will be hereinafter more fully disclosed.

In the operation of my device the bottom of the pan is first covered with a layer of soil 21, after which a leveling bar 22, consisting of a body portion 23, guide flanges 24 and a handle 25, is operated over the soil to level the same so that the screen 14 can be conveniently mounted to repose on the soil. The containers 15 are now arranged as mentioned heretofore and seeds are then dropped into the containers, one seed being adapted for each container and arranged so that the number of the seed as determined by the graduated strips 18 will correspond with a similar number secured in any convenient manner upon the ear of corn or other product from which the seed has been taken. The pan 12 is now filled with water, preferably hot water, after which the cover is mounted to close the pan and the entire device is permitted to remain in this position for a specified time to permit the seeds to bloat or otherwise advance in growth. The cloth 20 is preferably used to draw the moisture upwardly from the soil 21, through the containers 15 so that the seeds will obtain the full benefit of the moisture in the pan, the mentioned cloth 20 acting as a drawing medium for the moisture. When it is desired to remove the seeds, the closures 12 are slid upwardly thus permitting the water contained in the pan to flow outwardly through the openings 11. Perforated screens 26 are preferably arranged immediately in front of the openings 11 to prevent the soil 21 from passing outwardly with the water when the same is exhausted from the pan.

From the foregoing description it will be readily seen that a device is employed in which each seed is retained in a separate chamber, each chamber being independently removable from the pan and each chamber being provided with a number to permit of locating any desired seed in a particular chamber.

Although for the purpose of describing my invention I have disclosed a particular manner of testing the seeds, it will be understood that various tests can be carried on with my device, the most prominent of which is known as the "hot water test". It will be also understood that various departures can be made from the construction of the description without departing from the spirit of the invention, the scope of the same being defined in the appended claims.

Having thus fully described the invention, what I claim as new, is:—

1. In a device of the class described, the combination of a pan provided with openings, closures mounted to slide on the said pan and adapted to normally close the said openings, a perforated screen for removable disposal in the said pan, containers, each consisting of a U-shaped piece of material and arranged on the said screen, the sides of the said pan being adapted to constitute a side of each of the containers arranged adjacent to the sides of the pan and a side of each succeeding container being formed by a side of the containers arranged adjacent the sides of the pan and a cover for removable engagement with the said pan to close the same.

2. In a device of the class described, the combination of a pan provided with openings, closures mounted to slide on the said pan and adapted to normally close the said openings, a perforated screen for removable disposal in the said pan, containers, each consisting of a U-shaped piece of material and arranged on the said screen, the sides of the said pan being adapted to constitute a side of each of the containers arranged adjacent the sides of the pan, and a side of each succeeding container being formed by a side of the containers arranged adjacent the sides of the pan, a cover for removable engagement with the said pan to close the same, graduated strips removably mounted within the said pan and uprights secured to the inner sides of the said pan for supporting the said strips.

3. In combination with a seed tester, a series of independently removable containers for disposal in the pan of the seed tester, each container consisting of a U-shaped piece of material arranged so that a second container, arranged adjacent the first mentioned container will form a side of the first mentioned container.

In testimony whereof I affix my signature in presence of two witnesses.

JOHN MORTON PEEPLES.

Witnesses:
J. P. FITZGIBBON,
W. G. MCCALL.

---

Copies of this patent may be obtained for five cents each, by addressing the "Commissioner of Patents, Washington, D. C."